Figure 1:
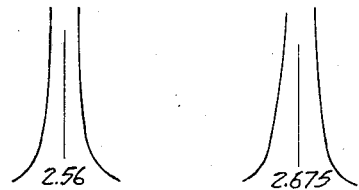
Figure 2:
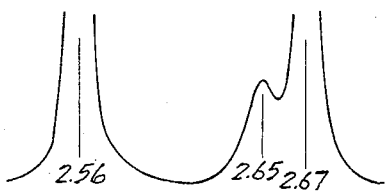
Figure 3:
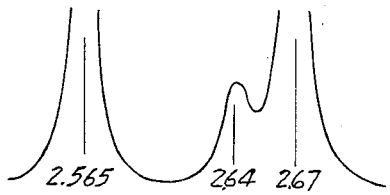
Figure 4:
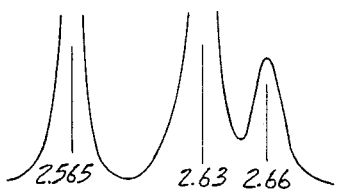
Figure 5:
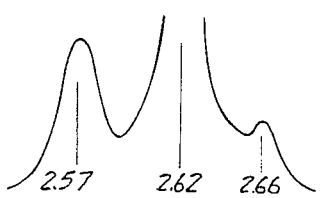
Figure 6:
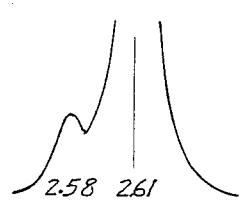
Figure 7:
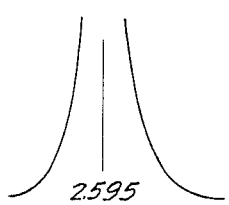

United States Patent [19]

Stradley et al.

[11] 3,717,497
[45] Feb. 20, 1973

[54] REFRACTORY ARTICLES AND METHOD OF MANUFACTURE

[75] Inventors: Norman H. Stradley, Signal Mountain; Harry C. Dunegan, Chattanooga, both of Tenn.

[73] Assignee: American Lava Corporation, Chattanooga, Tenn.

[22] Filed: March 25, 1971

[21] Appl. No.: 127,995

[52] U.S. Cl. ................................. 117/169 R, 106/66
[51] Int. Cl. ........................................... C04b 35/10
[58] Field of Search ........ 117/123 A, 169 R, 125, 98, 117/5.1, 54, DIG. 9; 148/6.2; 106/55, 66

[56] References Cited

UNITED STATES PATENTS

| 3,540,915 | 11/1970 | Kirchner | 117/169 R |
| 3,219,730 | 11/1965 | Bliton et al. | 117/105.2 X |
| 2,325,553 | 7/1943 | Schleicher et al. | 117/54 |

FOREIGN PATENTS OR APPLICATIONS

| 603,404 | 8/1960 | Canada | 106/66 |

Primary Examiner—Ralph S. Kendall
Assistant Examiner—Caleb Weston
Attorney—Kinney, Alexander, Sell, Steldt & Delahunt

[57] ABSTRACT

A method for hardening dressed and dimensioned ceramics which does not require further dimensioning after hardening requires repeated impregnation with hardening agent and are at temperatures below 1,000° C. followed by a cure above 1,000° C. and preferably from about 1,100° C. to about 1,400° C. for $Al_2O_3$—$Cr_2O_3$ systems in which chromic acid, which reduces to $Cr_2O_3$ on firing, is employed with $Al_2O_3$ to form a hard solid solution of $Al_2O_3$ and $Cr_2O_3$ on firing which acts as a bond cement in the alumina-chromia system.

4 Claims, 7 Drawing Figures

INVENTORS
NORMAN H. STRADLEY
BY HARRY C. DUNEGAN
Kinney, Alexander,
Sell, Steldt & De La Hunt
ATTORNEYS

REFRACTORY ARTICLES AND METHOD OF MANUFACTURE

This invention relates to refractory articles and to a method for the manufacture thereof. More particularly, this invention relates to a process which involves repeatedly impregnating a porous ceramic article with a chemical solution, followed by a low temperature cure. The impregnation-cure cycle is continued until substantially all of the voids in the ceramic structure are filled with residues of the chemical solution employed. The article is then subjected to a heat treatment at high temperature for a sufficiently long time to chemically combine at least a portion of the original ceramic with the impregnating material thereby forming ceramics having outstanding hardness, wear and abrasion resistance. When chromic acid is used with alumina there is formation of a hard solid solution of $Al_2O_3$ in $Cr_2O_3$. One of the features of ceramic articles made by this process is that virtually no change occurs in the original dimensions of the porous refractory structure during the aforementioned process. Therefore, shaping is carried out on the porous ceramic while it is relatively soft and expensive diamond grinding of the finished ceramic article is eliminated.

Luxembourg Pat. No. 57,685, assigned to Kaman Sciences Corporation, describes the chemical hardening of ceramic materials using partially sintered base materials. The patent recites procedures for chemically impregnating porous ceramic articles with chemical solutions, followed by low temperature cures. The cycle of impregnation and low temperature curing is repeated until no further improvement in properties is achieved. The present invention provides method for gaining hardness and wear and abrasion resistance greater than that obtained in the prior art process.

The fabrication of conventional, hard ceramics which are resistant to wear and abrasion comprises the following steps:

1. Combining a finely divided ceramic powder of the desired composition with a binder
2. Forming the ceramic powder into "green compacts," by any of various conventional procedures
3. Firing the "green compacts," i.e., sintering, at relatively high temperature.

Sintering is carried out at temperatures sufficiently high to close the internal voids left after forming and volatilization of any volatile binders. Dimensions of the finished sintered article are a problem because any non-uniformity which exists in the "green compact" causes non-uniform shrinkage during the high temperature of sintering and hence causes variation in the dimensions of the sintered article. The linear shrinkage during high temperature sintering is often 15 percent or more.

It is an object of the invention to provide hard abrasion resistant articles having reduced shrinkage on firing to the hardened state. Other objects will become evident herein.

The process of the invention accomplishes these and other objects by impregnating a porous refractory alumina structure with a chemical solution of a soluble or suspendable chromium material, such as chromic acid, which is selected to provide $Cr_2O_3$ which combines at high temperatures with the alumina to form a hard, abrasion resistant product. "Porous refractory structure" is intended to mean, in its broader sense, the partially sintered green ceramic compact. In such a porous refractory structure a large number of internal pores remain in the ceramic structure after firing at temperatures well below the final sintering temperature or temperature necessary to approach maximum hardness. Linear shrinkage during processing of partially sintered porous refractory structure is 3 percent or less.

The term "impregnation" is here used to describe the process by which solutions of inorganic materials are introduced into the pores, spaces, cavities or voids of a body. When cured at low temperatures they deposit an inorganic substance in the pores, spaces, cavities or voids of the structure or body. The impregnation need not be complete in every case, but may vary according to the particular article desired. It is preferred that all pores at the surface be substantially fully impregnated and that after a number of cycles substantially all of the pores at the immediate surface be filled with the selected inorganic substance such as chromium oxide and that impregnation penetrate to a sufficient depth so that, after heat treatment at a high temperature, a hard wear resistant product is formed. The term "heat treatment" is used to mean that the article is subjected to a sufficiently high temperature so that interaction occurs between the chromia and alumina. It is a surprising feature that alumina appears to dissolve to give a solid solution in chromia rather than, as might be expected, the reverse. This is particularly illustrated by the accompanying drawings, FIGS. 1 to 7, which show in somewhat idealized form (particularly as to background details) the phase changes observed as samples are fired at higher and higher temperatures. It is therefore proper to describe the process of the invention as consisting essentially of the repeated impregnation and curing of a chromium solution in porous alumna ceramic at a temperature sufficient to effect deposition of insoluble reactive chromia in pores, spaces or cavities followed by further heat treatment at a higher temperature sufficient to bring about phase changes and particularly formation of solid solutions.

The pore size and pore volume should be such that the porous structure can be filled after a reasonable number of impregnation and cure cycles, usually at least 5 and up to about 15, preferably about 8 to 12. It is preferred that the size of the interstitial or pore opening should be in the range of about 0.05 to 1 micron and the pore volume in the range of about 0.05 to 0.25 cc./gm. The lower limit is dictated by consideration of the rate of impregnation. As the pore size becomes very small, the rate of impregnation becomes negligible. The upper limit is dictated by consideration of the number of impregnation and cure cycles. As the pore size and volume become large, a larger number of cycles are required to fill the porous refractory structure.

The invention is now further illustrated by Examples:

EXAMPLE 1

This example is for purposes of comparison only and illustrates results obtained when the teachings of this invention are not employed and only low temperature curing is used, specifically chemical impregnation of a porous refractory structure is followed by a low temperature cure. This provides specimens for comparison. The impregnant for this example is chromic acid solution and the porous refractory structures are pressed specimens of 99.5 percent aluminum oxide fired to 1,200° C. and are nominally 44.5 mm. (1.75 in.) long by 15.2 mm. (0.60 in.) wide by 6.3 mm. (0.25 in.) thick and having a density of about 2.47 g./cc.

The chromic acid solution (sp. gr. 1.61) is prepared by dissolving 500g. of $CrO_3$ (crystals or flakes) in 400 cc. of water.

Using the above solution, the porous refractory structures of aluminum oxide are impregnated and cured as follows:

Impregnation Method

1. Porous ceramic parts are placed in a container which is placed in a pressure tank.
2. 1.61 specific gravity chromic acid solution is added to cover parts.
3. Pressure is applied to tank and pressurized at 6.0 to 6.5 atmospheres pressure (90-95 psi) for 10 minutes.
4. Pressure is released and parts are soaked for 5 minutes.
5. Pressure is applied again and held at 6.0 to 6.5 atmospheres pressure for 10 minutes.
6. Pressure is released and parts are removed from acid solution and excess liquid on surfaces removed, by wiping with absorbent paper or by rapid rinsing with water.

Cure Method

1. Parts are dried at 175° C. for 1 hour and then soaked for 1 hour in each of progressively hotter ovens at 260° C., 400° C. and 650° C.
2. Cooling is in two stages, first for 1 hour at 400° C. and then exposed to normal surroundings.

Alumina pieces of 99.5 percent porous alumina impregnated with chromic acid and cured 12 times by the above procedure are compared with similar parts which are not impregnated but have been fired dense at 1,680° C. The impregnated pieces contain deposits of $Cr_2O_3$ in the pores or voids of the alumina structure as shown by X-ray diffraction and electron microprobe analysis. Dimensions are held within 0.1 percent during impregnation-cure cycles.

Wear resistance is tested using an arrangement in which small rectangular pieces of ceramic of the above dimensions ride against the 6.2 mm. wide (¼ in.) periphery of a 14.6 cm. (5.75 in.) outer diameter rotating wheel (face coated with tungsten carbide) for 45 minutes while flooded with a ceramic slurry. Contact pressure between the ceramic and wheel is adjusted by weights of 250 g. on the end of a lever arm about 39.4 cm. long to which the ceramic piece is attached at 12.7 cm. from the fixed end. The wheel is driven by means of an electric motor at 47 RPM giving a surface speed of about 22 meters per minute. To perform the test a ceramic slurry (100 parts alumina powder, 5 parts Tennessee ball clay, 50 parts water, and 2 parts dispersing agent) is fed onto the ceramic and rotating wheel. This procedure provides a convenient and rapid (45 minutes) means of comparing wear rates.

The wear resistance test shows that chromic acid hardened 99.5 percent alumina is less resistant than dense fired material. Wear scars in the above test are 15 and 8 mm. respectively.

Abrasion resistance is measured by the depth of penetration in 60 seconds of a stream of about 35 to about 50 micron diameter hard alumina particles blown from a 0.85 mm. diameter opening at about 4 atmospheres pressure against a test piece (about 15 × 45 × 6.3 mm.) at about 6.3 mm. distance. Dense-fired 99.5 percent alumina is penetrated to about 0.07 mm., and hardened porous alumina to about 0.23 mm.

EXAMPLE 2

This example illustrates the product obtained by the process of this invention. Aluminum oxide plates of 99.5 percent purity fired to 1,200° C. are made to the dimensions of Example 1 and then impregnated and cured 12 times with chromic acid solution as described in Example 1. Individual impregnated specimens are heated to 1,100° C., 1,200° C., 1,300° C., 1,400° C., 1,500° C., and 1,600° C. Dimensional changes during heat treatment (1,100° to 1,600° C.) are less than 0.1 percent. This heat treatment procedure combines the chromic oxide with the porous alumina structure to greater and greater extent. X-ray diffraction measurement show that alumina in chromia solid solutions are formed in the temperature range of 1,100° to 1,600° C.; and as the temperature increases, an increasing amount of solid solution is formed. Reference is made to FIGS. 1 to 7 inclusive. FIG. 1 corresponds to a sample of Example 1 fired at 1,000° C. and the other FIGS. 2 – 7 are respectively the six samples of this Example. These are somewhat idealized portions of X-ray diffractometer traces.

Numerical values in the Figures refer to the 104 (hkl) plane and are abscissae in angstrom units. Maximum peaks are shown as truncated as exact heights are subject to uncontrollable variations. The drift of the solid solution peak toward the position of the $Al_2O_3$ peak shows that it is alumina dissolving in excess chromia which provides the hard cementing phase. Data on X-rays of alumina and chromia are available in National Bureau of Standards Publication No. 539, Standard X-ray Diffraction Powder Patterns, Vol. 5, page 22 and Vol. 9, page 3.

It will be seen that a peak (2.65) corresponding to a solid solution (ultimately about 60 $Al_2O_3$; 40 $Cr_2O_3$) starts forming at 1,100° and grows, being slightly displaced ultimately to 2.595, until it is the only detectible phase present. At the same time the $Al_2O_3$ and $Cr_2O_3$ peaks diminish and finally disappear.

TABLE 1

| Impregnant | Heat Treatment °C. | Rockwell 15N | 45N |
|---|---|---|---|
| $CrO_3$ – 12 times | none | 94 | 78 |
| none (dense fired) | none | 95 | 82 |
| $CrO_3$ – 12 times | 1,200 | 96 | 83 |

Wear and abrasion resistance tests are performed as in Example 1 and the results are compared in Table 2 with the results there obtained.

TABLE 2

| Impregnant | Heat Treatment °C. | Wear Scar Length (mm.) | Abrasive Pit Depth (mm.) |
|---|---|---|---|

| | | | |
|---|---|---|---|
| $CrO_3$ – 12 times | none | 15 | 0.23 |
| none (dense fired) | none | 8 | 0.07 |
| $CrO_3$ – 12 times | 1,100 | 5 | 0.05 |
| $CrO_3$ – 12 times | 1,200 | 5 | 0.04 |
| $CrO_3$ – 12 times | 1,300 | 5 | 0.03 |
| $Cro_3$ – 12 times | 1,400 | 5 | 0.03 |
| $CrO_3$ – 12 times | 1,500 | 10 | 0.04 |
| $CrO_3$ – 12 times | 1,600 | 10 | 0.04 |

The above wear and abrasion resistance data show that chemically hardened 99.5 percent alumina when heat treated to 1,100° C. and above according to the process of the invention is better than 99.5 percent porous alumina impregnated and fired as described in Example 1. Furthermore, the data show that over a relatively narrow range of about 1,100° to about 1,400° C. somewhat better products are obtained than at higher temperatures. This is therefore a preferred range for treatment. It appears that the cemented compositions still including portions of $Al_2O_3$ and $Cr_2O_3$ are harder and more wear and abrasive resistant than compositions which have transformed almost completely to the solid solution. It is also interesting that firing in these ranges increases and stabilizes weak electrical conductive characteristics.

What is claimed is:

1. A hard, abrasion resistant refractory ceramic structure consisting essentially of (I) structural phase of alumina, having initially a volume of pores of 0.05 to 0.25 cc per gram, (II) a pore filling phase of chromia in at least the pores near the outer surfaces of said structure substantially filling said pores and (III) a solid solution phase of said alumina with said chromia.

2. A process for hardening a refractory alumina ceramic comprising
   A. impregnating a porous partially fired alumina structure comprising from 0.05 to 0.25 cc per gram of pore volume with a solution of chromic acid followed by heating to a temperature of from about 600° to 1,000° C,
   B. repeating the impregnation and heating of step A a further number of times to a total of at least five times and up to saturation of the porous alumina structure and, thereafter,
   C. heating the impregnated structure to a temperature in the range of 1,000° to 1,600° C and below the sintering temperature of said structure.

3. The process according to claim 2 wherein impregnation is repeated from 5 to 15 times and final firing is at a temperature of from about 1,100° to about 1,400° C.

4. The process according to claim 3 wherein substantially all the pores at the immediate surface are filled with chromium oxide.

* * * * *